US010858289B2

(12) United States Patent
Gimeno Santos et al.

(10) Patent No.: US 10,858,289 B2
(45) Date of Patent: Dec. 8, 2020

(54) REDUCING BLISTER FORMATION IN POLYURETHANE CEMENTITIOUS HYBRID SYSTEMS

(71) Applicant: SIKA TECHNOLOGY AG, Baar (CH)

(72) Inventors: Patricia Gimeno Santos, Stuttgart (DE); Carola Kaddatz, Oppenweiler (DE); Jochen Grötzinger, Schwäbisch Gmünd (DE)

(73) Assignee: SIKA TECHNOLOGY AG, Baar (CH)

( * ) Notice: Subject to any disclaimer, the term of this patent is extended or adjusted under 35 U.S.C. 154(b) by 17 days.

(21) Appl. No.: 16/307,883

(22) PCT Filed: Jul. 5, 2017

(86) PCT No.: PCT/EP2017/066836
§ 371 (c)(1),
(2) Date: Dec. 6, 2018

(87) PCT Pub. No.: WO2018/007470
PCT Pub. Date: Jan. 11, 2018

(65) Prior Publication Data
US 2019/0352230 A1 Nov. 21, 2019

(30) Foreign Application Priority Data

Jul. 7, 2016 (EP) ..................... 16178373

(51) Int. Cl.
*C04B 28/02* (2006.01)
*C04B 24/26* (2006.01)
*C04B 24/28* (2006.01)
*C04B 40/06* (2006.01)
*C04B 24/16* (2006.01)
*C04B 111/00* (2006.01)

(52) U.S. Cl.
CPC ............. *C04B 28/02* (2013.01); *C04B 24/165* (2013.01); *C04B 24/2647* (2013.01); *C04B 24/2658* (2013.01); *C04B 24/282* (2013.01); *C04B 40/065* (2013.01); *C04B 2111/00336* (2013.01)

(58) Field of Classification Search
CPC ............ C04B 24/2658; C04B 24/2647; C04B 40/065
See application file for complete search history.

(56) References Cited

U.S. PATENT DOCUMENTS

| 2003/0083158 A1* | 5/2003 | Ishino | .................. | C09D 175/04 473/378 |
| 2012/0065301 A1* | 3/2012 | Burge | ................. | C08F 290/142 524/5 |
| 2016/0075600 A1* | 3/2016 | Gimeno | .................. | C08L 75/04 524/650 |

FOREIGN PATENT DOCUMENTS

| EP | 1 348 729 A1 | 10/2003 |
| EP | 1 138 697 B1 | 11/2003 |
| EP | 1 061 089 B1 | 3/2004 |
| EP | 2 944 622 A1 | 11/2015 |
| JP | H08-169744 A | 7/1996 |
| JP | 2000-178059 A | 6/2000 |
| WO | 96/06057 A1 | 2/1996 |
| WO | 2009/077591 A2 | 6/2009 |
| WO | 2011/029711 A1 | 3/2011 |

OTHER PUBLICATIONS

Sep. 11, 2017 International Search Report issued in International Patent Application No. PCT/EP2017/066836.
Sep. 11, 2017 Written Opinion of the International Searching Authority issued in International Patent Application No. PCT/EP2017/066836.

* cited by examiner

*Primary Examiner* — Jeffrey C Mullis
(74) *Attorney, Agent, or Firm* — Oliff PLC

(57) ABSTRACT

A multi-component composition, in particular a three-component composition, especially for manufacture of a polyurethane cementitious hybrid flooring, including or made of: a polyol component (A) including at least one polyol and water; a hardener component (B) including at least one polyisocyanate compound; a solid component (C) including at least one hydraulic binder; and wherein at least one of the components of the multi component composition includes at least one comb polymer having a main chain including acid groups, and side chains being attached on the main chain.

17 Claims, No Drawings

REDUCING BLISTER FORMATION IN POLYURETHANE CEMENTITIOUS HYBRID SYSTEMS

TECHNICAL FIELD

The invention relates to a multi component composition, in particular a three component composition, especially for the manufacture of a polyurethane cementitious hybrid flooring. Also, the invention is concerned with a method for preparing a flooring, screed and/or coating, in particular a polyurethane cementitious hybrid flooring or coating. A further aspect of the invention is related to a cured body and to the use of a comb polymer in mortar and/or screed compositions based on polyurethane and hydraulic binders, especially in polyurethane cementitious hybrid flooring systems.

BACKGROUND ART

Cementitions flooring compositions are well known and widely used where smooth and chemically and mechanically resistant flooring solutions are required. In many such applications, epoxy resin based flooring compositions offer a suitable solution, also due to the fact that they often provide aesthetically pleasing and glossy surfaces. On the other hand, epoxy resin based flooring compositions suffer from certain disadvantages. For example, undesired blushing effects may occur, especially at lower temperatures. Also gloss intensity is often influenced by temperature and may decrease on cold environments. Furthermore, the chemicals involved (i.e. epoxides and amines) are increasingly considered hazardous by European Union Regulation REACH, so that an alternative chemistry to overcome such limitations is desirable.

In this context, polyurethane (PU) cementitious hybrid systems are known to offer an alternative solution for the preparation of coating and flooring products that have outstanding mechanical properties and do not suffer from the drawbacks associated with epoxy resin compositions. Such systems comprise hydraulic binders or cement, respectively as well as polyurethane binders in combination. Polyurethane cementitious hybrid systems are complex systems wherein during curing of the precursor components two main reactions occur, namely the reaction of a polyol and a polyisocyanate to form the polyurethane and the reaction of hydraulic binder or cement and water, generally called hydration. Upon hydration the hydraulic binder is hardened to a solid material. The hydration is usually effected in the presence of aggregates such as sand or gravel so that the aggregate particles are bound together by the hydraulic binder material to obtain mortar or concrete.

Since both reactions take place in the same mixture, it is almost unavoidable that unwanted side reactions occur. Specifically, the reactive isocyanate compounds can react with water resulting in the generation of amine compounds and $CO_2$ gas. The generation of $CO_2$ is a problem since it may lead to blister formation. Moreover, the formation of amines prompts a consecutive side reaction since the isocyanate compounds also react with amines to form urea compounds.

Due to the complex reactions and side reactions, it is difficult to modify the systems without affecting mechanical and workability characteristics and open time. In order to diminish unwanted side reactions and to maintain a sufficiently long shelf life, such PU cementitious hybrid systems typically use a three component composition, including basically a water/polyol component, a hardener (polyisocyanate) component, and a hydraulic binder or cement component.

Thereby, in order to reduce blister formation, lime or calcium hydroxide can be added to the cement component. Such a composition is for example described in EP 2 944 622 A1 (Sika Technology AG). With such a three component setup it is possible to create stable compositions which yield smooth, mechanically and chemically resistant and even glossy flooring surfaces after mixing and application.

However, known compositions are still problematic with regard to health risks for workers during processing. In fact, unprotected exposure to known compositions can pose health risks, such as e.g. severe skin irritation, chemical burns, blindness, or lung damage.

There is thus a need to develop new and improved compositions for polyurethane cementitious hybrid systems which reduce or overcome the aforementioned drawbacks.

DISCLOSURE OF THE INVENTION

It is an object of the present invention to provide an improved composition for polyurethane cementitious hybrid systems which is less problematic with regard to health risks for workers during processing. Simultaneously, with the composition it should be possible to make polyurethane cementitious hybrid systems with gloss and smoothness and having outstanding mechanical and workability properties as well as chemical resistance. Especially, blister formation due to unwanted side reactions is to be avoided as much as possible.

Surprisingly, it has been found that these objects are achieved by the features of claim 1. Thus, the core of the invention is a multi-component composition, in particular a three component composition, especially for manufacture of a polyurethane cementitious hybrid system or flooring, comprising or consisting of:

a) a polyol component (A) comprising at least one polyol and water b) a hardener component (B) comprising at least one polyisocyanate compound;

c) a solid component (C) comprising at least one hydraulic binder;

Thereby, at least one of the components of the multi component composition comprises at least one comb polymer having a main chain comprising acid groups, and side chains being attached to the main chain.

Surprisingly, it was found that by addition of a comb polymer, the amount of lime or calcium hydroxide can drastically be reduced without impairing quality of polyurethane cementitious hybrid systems produced with the inventive composition or causing blister formation on surfaces of such systems. Since lime or calcium hydroxide causes severe skin irritation, chemical burns, blindness, or lung damage, decreasing the proportion of these problematic substances greatly reduces health risks for workers during processing.

Moreover, the inventive multi component composition can be used as self-levelling or self-smoothing screed or mortar and unexpectedly enables manufacture of polyurethane cementitious hybrid flooring systems exhibiting significantly improved gloss so that glossy/semiglossy surfaces can be achieved. Nevertheless, the characteristics as to workability, open time, mechanical properties such as compressive strength are outstanding. Also resistance towards chemical degradation is excellent.

Additional aspects of the invention are subject of further independent claims. Particularly preferred embodiments are outlined throughout the description and the dependent claims.

Ways of Carrying Out the Invention

A first aspect of the invention relates to a multi component composition, in particular a three component composition, especially for manufacture of a polyurethane cementitious hybrid system or flooring, comprising or consisting of:

a) a polyol component (A) comprising at least one polyol and water b) a hardener component (B) comprising at least one polyisocyanate compound;

c) a solid component (C) comprising at least one hydraulic binder;

wherein at least one of the components of the multi component composition comprises at least one comb polymer having a main chain comprising acid groups, and side chains being attached on the main chain.

Compound names beginning with "poly" designate substances, which formally contain, per molecule, two or more of the functional groups occurring in their names. The compound can be a monomeric, oligomeric or polymeric compound. For instance, a polyol is a compound having two or more hydroxy groups, a polyisocyanate is a compound having two or more isocyanate groups.

If not stated otherwise, the average molecular weight is understood to mean the number average molecular weight, as determined using conventional methods, preferably by gel permeation-chromatography (GPC), typically using polystyrene as standard, styrene-divinylbenzene gel with porosity of 100 Angstrom, 1,000 Angstrom and 10,000 Angstrom as the column and tetrahydrofurane as a solvent, at 35° C. When determining the molecular weight of comb polymers, polyethylene glycol (PEG) is used as a standard.

The composition used according to the invention is a multi-component composition, i.e. the composition comprises three or more individual components. The components are stored separately in order to avoid spontaneous reaction. The components may be assembled together as a package.

For use, the components are combined with each other. When the components are mixed together, hydration and curing reactions begin so that the composition is to be processed within the open time after mixing the components. The multi-component composition preferably consists of three components. Optionally however, one or more additional components may be included for specific purposes. For instance, an additional component comprising coloring agents such as pigments may be used for coloring purposes.

Hybrid systems comprising organic binder components including a polyol component and a polyisocyanate hardener component suitable for cementitious applications are known to the skilled person and commercially available, for instance products of Sika Schweiz AG. An example for a commercially available combination of a binder component comprising polyol and an isocyanate hardener component are Sikafloor® PurCem products from Sika Schweiz AG.

It is clear that the proportion of a certain ingredient in the mixture of the components depends on the content of this ingredient in the respective component and the mixture ratio of the components. In the following, ratios referring to ingredients in different components relate to suitable or correct proportions of each component according to operating instructions, i.e. to the mixing ratios to be used for mixing the components and, in use to the mixture of the components prepared.

Comb Polymer

The comb polymer has a main chain comprising acid groups, and side chains being attached on the main chain.

With advantage, the side chains are bonded to the main chain via ester, ether, amide and/or imide groups. Ester, ether and/or amide groups are preferred, especially ester and/or ether groups.

More particularly the side chains comprise polyalkylene oxide side chains. With preference at least 50 mol %, more particularly at least 75 mol %, preferably at least 95 mol %, especially at least 98 mol % or 100 mol % of the side chains consist of polyalkylene oxide side chains.

A fraction of ethylene oxide units in the polyalkylene oxide side chains, based on all alkylene oxide units present in the side chains, is preferably more than 90 mol %, more particularly more than 95 mol %, preferably more than 98 mol %, especially 100 mol %.

In particular the polyalkylene oxide side chains have no hydrophobic groups, more particularly no alkylene oxides having three or more carbon atoms. A high fraction of ethylene oxide units or a low level of alkylene oxides having three or more carbon atoms reduces the risk of unwanted air entrainment.

The polyalkylene oxide side chains have, in particular, a structure in accordance with formula $-[AO]_n-R^a$. In this formula, in particular, A is C2 to C4 alkylene. $R^a$ is preferably H or a C1 to C20 alkyl, cyclohexyl or alkylaryl group. Advantageously n is 2-250, especially 10-150.

The term "acid groups" presently encompasses, in particular, carboxyl groups, sulfonic acid groups, phosphoric acid groups and/or phosphonic acid groups. The acid groups may each be in protonated form, in deprotonated form, for example as anion, and/or in the form of a salt with a counter ion or cation. Consequently, for example, the acid groups may be in partially or fully neutralized form.

The acid groups in particular have a structure according to formula $COOM$, $SO_2-OM$, $-O-PO(OM)_2$ and/or $-PO(OM)_2$. Very preferably the acid groups have a structure according to the formula $-COOM$. Each M here, independently of the others, is H, an alkali metal ion, an alkaline earth metal ion, a di- or trivalent metal ion, an ammonium ion or an organic ammonium group.

If M is an organic ammonium group, it derives in particular from alkylamines or from C-hydroxylated amines, more particularly from hydroxyalkylamines, such as ethanolamine, diethanolamine or triethanolamine, for example.

The comb polymer is in particular a polycarboxylate ether with a polycarboxylate backbone and polyether side chains, wherein the polyether side chains are bound via ester, ether and/or amide groups to the polycarboxylate backbone.

A weight-average molecular weight (Mw) of the comb polymer is more particularly 5,000-150,000 g/mol, preferably 10,000-100,000 g/mol. A number-average molecular weight (Mn) of the comb polymer is advantageously 3,000-100,000 g/mol, more particularly 8,000-70,000 g/mol.

The comb polymer preferably comprises or consists of the following structural subunits:

a) a mole fractions of a structural subunit S1 of the formula (I)

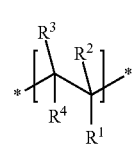

(I)

b) b mole fractions of a structural subunit S2 of the formula (II)

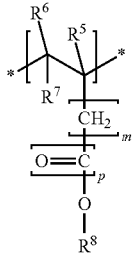

(II)

c) optionally c mole fractions of a structural subunit S3 of the formula (III)

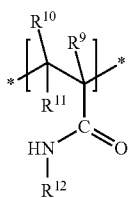

(III)

d) optionally d mole fractions of a structural subunit S4 of the formula (IV)

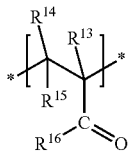

(IV)

where $R^1$, in each case independently of any other, is —COOM, —$SO_2$—OM, —O—PO(OM)$_2$ and/or —PO(OM)$_2$, $R^2$, $R^3$, $R^5$, $R^6$, $R^9$, $R^{10}$, $R^{13}$ and $R^{14}$, in each case independently of one another, are H or an alkyl group having 1 to 5 carbon atoms, $R^4$, $R^7$, $R^{11}$ and $R^{15}$, in each case independently of one another, are H, —COOM or an alkyl group having 1 to 5 carbon atoms, M, independently of any other, is $H^+$, an alkali metal ion, an alkaline earth metal ion, a di- or trivalent metal ion, an ammonium ion or an organic ammonium group, m is 0, 1 or 2, p is 0 or 1, $R^8$ and $R^{12}$, in each case independently of one another, are a $C_1$ to $C_{20}$ alkyl, cycloalkyl or alkylaryl group or are a group of the formula -[AO]$_n$—$R^a$, where A is $C_2$ to $C_4$ alkylene, $R^a$ is H, a $C_1$ to $C_{20}$ alkyl, cyclohexyl or alkylaryl group, and n is 2-250, especially 5-100, preferably, 10-50, $R^{16}$, independently of any other, is $NH_2$, —$NR^bR^c$ or —$OR^dNR^eR^f$, where $R^b$ and $R^c$, independently of one another, are a $C_1$ to $C_{20}$ alkyl, cycloalkyl, alkylaryl or aryl group, or are a hydroxyalkyl group or are an acetoxyethyl ($CH_3$—CO—O—$CH_2$—$CH_2$—) or a hydroxyisopropyl (HO—CH($CH_3$)—$CH_2$—) or an acetoxyisopropyl ($CH_3$—CO—O—CH($CH_3$)—$CH_2$—) group;

or $R^b$ and $R^c$ together form a ring of which the nitrogen is a part, in order to construct a morpholine or imidazoline ring;

$R^d$ is a $C_2$-$C_4$ alkylene group, $R^e$ and $R^f$ each independently of one another are a $C_1$ to $C_{20}$ alkyl, cycloalkyl, alkylaryl or aryl group or a hydroxyalkyl group, and where a, b, c and d are mole fractions of the respective structural subunits S1, S2, S3, and S4, where a/b/c/d=(0.1-0.9)/(0.1-0.9)/(0-0.8)/(0-0.8), more particularly a/b/c/d=(0.3-0.7)/(0.2-0.7)/(0-0.6)/(0-0.4), preferably a/b/c/d=(0.4-0.7)/(0.3-0.6)/(0.001-0.005)/0, and with the proviso that a+b+c+d is 1.

The sequence of the structural subunits S1, S2, S3, and S4 may be alternating, block like or random. It is also possible, moreover, for there to be further structural subunits in addition to the structural subunits S1, S2, S3, and S4.

The structural subunits S1, S2, S3, and S4 together preferably have a weight fraction of at least 50 wt %, more particularly at least 90 wt %, very preferably at least 95 wt %, of the total weight of the comb polymer.

A ratio of a/(b+c+d)=is in particular in the range of 0.5-8, preferably 0.75-5, especially 0.8-3, more particularly 0.85-2 or 0.9-1.5.

In the comb polymer, in particular, $R^1$ is COOM, $R^2$ is H or $CH_3$, and $R^3$=$R^4$=H. The comb polymer can therefore be prepared on the basis of acrylic or methacrylic acid monomers, this being of advantage from an economic standpoint.

Likewise advantageous are comb polymers where $R^1$=COOM, $R^2$=H, $R^3$=H, and $R^4$=COOM. Such comb polymers can be prepared on the basis of maleic acid monomers.

Advantageously, $R^5$ is H or $CH_3$ and $R^6$=$R^7$=H. Comb polymers of these kinds can be prepared, for example, starting from (meth)acrylic esters, vinyl ethers, (meth)allyl ethers or isoprenol ethers.

If S3 is present, then in particular $R^9$ is H or $CH_3$ and $R^{10}$=$R^{11}$=H.

If S4 is present, then in particular $R^{13}$ is H or $CH_3$ and $R^{14}$=$R^{15}$=H.

Very advantageously, $R^2$ and $R^5$ are mixtures of H and —$CH_3$. Preferred in that case are mixtures with 40-60 mol % H and 40-60 mol % —$CH_3$. If the corresponding structural subunits are present, this is also true, in particular, for $R^9$ and $R^{13}$. With preference, moreover, $R^3$ and $R^6$ are H, and also, if the corresponding structural subunits are present, $R^9$ and $R^{13}$ are H.

According to a further advantageous embodiment, $R^1$ is COOM, $R^2$=H, $R^5$=—$CH_3$, and $R^3$=$R^4$=$R^6$=$R^7$=H.

In the case of another advantageous embodiment, $R^1$ is COOM, $R^2$=$R^5$=H or —$CH_3$, and $R^3$=$R^4$=$R^6$=$R^7$=H.

In particular, $R^8$ and/or $R^{12}$ are -[AO]$_n$—$R^a$, and preferably A is $C_2$ alkylene and/or $R^a$ is H or a $C_1$ alkyl group.

Advantageously, n is 2-50, more particularly n is 5-40, preferably n is 20-30, especially n is 8-25, in particular n is 10-15.

In particular, m is 0 and p is 1. Likewise advantageously, m is 1 or 2 and p is 0, and, in particular, $R^5$ is —$CH_3$.

For particularly preferred comb polymers:

a) $R^1$ is COOM;

b) $R^2$ and $R^5$, independently of one another, are H, —$CH_3$ or mixtures thereof. Very advantageously, $R^2$ and $R^5$ are mixtures of H and —$CH_3$. Preference in that case is given to mixtures with 40-60 mol % H and 40-60 mol % —CH$_3$. If structural subunits S3 and/or S4 are present, this is also true, in particular, for R$^9$ and R$^{13}$;
c) R$^3$ and R$^6$ are H. If structural subunits S3 and/or S4 are present, this is also true, in particular, for R$^{10}$ and/or R$^{14}$;
d) R$^4$ and R$^7$, independently of one another, are H or —COOM, preferably H. If structural subunits S3 and/or S4 are present, this is also true, in particular, for R$^{11}$ and R$^{15}$;
e) Fe is -[AO]$_n$—R$^a$, and preferably A is C$_2$ alkylene and/or R$^a$ is H or a C$_1$ alkyl group. Advantageously n is 2-50, more particularly n is 5-40, preferably n is 20-30, especially n is 8-25. If structural subunit S3 is present, this is also true, in particular, for R$^{12}$;
f) m is 0 and p is 1.

The comb polymers used can be prepared in a conventional way.

A first process, also identified below as "polymer-analogous process", for preparing a comb polymer as described above comprises the following steps:
a) providing and/or preparing a base polymer BP comprising or consisting of a structural unit of the formula V

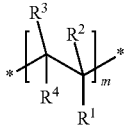

(V)

where
M, R$^1$, R$^2$, R$^3$, and R$^4$ are as defined above, with R$^1$ being more particularly -COOM, and
m>2, more particularly m=20-100;
b) esterifying the base polymer BP with a compound of the formula VI

HO—R$^8$ (VI)

c) optionally amidating the base polymer BP with a compound of the formula VII

H$_2$N—R$^{12}$ (VII)

d) optionally amidating and/or esterifying the base polymer BP with a compound of the formula VIII

H—R$^{16}$ (VIII)

to give the comb polymer CP,
where R$^8$, R$^{12}$ and R$^{16}$ are as defined above.

The base polymer BP in step a) is, in particular, a polyacrylic acid, a polymethacrylic acid and/or a copolymer of acrylic acid and methacrylic acid. A number-average molecular weight (M$_n$) of the base polymer BP of the formula (V) is, in particular, 500-20,000 g/mol, more particularly 500-10,000 g/mol, more preferably 3,000-6,000 g/mol.

Base polymers BP of this kind can be prepared in a conventional way from acrylic acid monomers and/or methacrylic acid monomers. It is also possible, for example, to use maleic acid monomers and/or maleic anhydride monomers, however. This may be advantageous from standpoints including those of economy and safety.

The base polymer BP is prepared in step a), in particular by aqueous radical polymerization, of acrylic acid and/or methacrylic acid, for example, in the presence of a radical initiator and/or of a chain transfer agent.

The radical initiator in step a) comprises, in particular, Na—, K— or ammonium peroxodisulfate. Likewise suitable as radical initiator in step a) is, for example, a redox couple based on H$_2$O$_2$/Fe$^{2+}$.

The chain transfer agent in step a) is preferably an alkali metal sulfite or hydrogen sulfite. Likewise advantageous is a phosphinic acid derivative. The chain transfer agent in step a) may also be an organic compound which contains a thiol group. Corresponding base polymers BP may in principle also be obtained commercially, from various suppliers.

Among the compounds which can be added for the esterification in step b) are acids and/or bases—as catalysts, for example. The esterification takes place advantageously at elevated temperatures of 120-200° C., more particularly 160-180° C. By this means it is possible to improve the yield significantly.

The compounds of the formulae V, VI and VII that are used in step b) are available commercially from various suppliers.

A second process, also identified below as "copolymerization process", for preparing a comb polymer as described above comprises a copolymerization of:
a) a mole fractions of monomers M1 of the formula IX

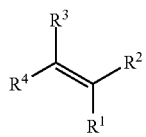

(IX)

b) b mole fractions of monomers M2 of the formula X

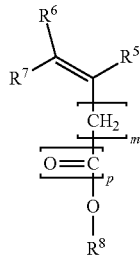

(X)

c) optionally c mole fractions of monomers M3 of the formula XI

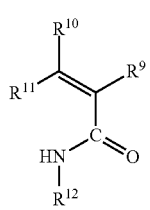

(XI)

d) optionally d mole fractions of monomers M4 of the formula XII

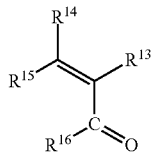

(XII)

where a, b, c and d represent the mole fractions of the respective monomers M1 M2, M3, and M4,
where a, b, M, $R^1$—$R^{16}$, m, and p are as defined above.

The monomers M2, M3, and M4 may be prepared in a conventional way by esterification or amidation of acrylic acid, methacrylic acid, maleic acid and/or maleic anhydride with compounds of the formulae VI, VII or VIII (see above).

For the copolymerization or the second process it is possible to use the radical initiators and/or chain transfer agents already stated above in connection with the first process.

Further details on the polymer-analogous reaction are disclosed, for example, in EP 1 138 697 B1 on page 7, line 20 to page 8, line 50 as well as in its examples, or in EP 1 061 089 B1 on page 4, line 54 to page 5, line 38 as well as in its examples. In a variation thereof, as described in EP 1 348 729 A1 on page 3 to page 5 as well as in its examples, the comb polymer can be produced in the solid state. The disclosure of these mentioned patent specifications is thus included herewith, in particular by reference. The production by polymer-analogous reaction is preferred.

Corresponding comb polymers are commercially available and marketed by Sika Schweiz AG under the trade name ViscoCrete®.

According to a further preferred embodiment, the comb polymer is used in the solid state of aggregation, for example in the form of a powder, flakes, pellets, granules and/or plates. Such solid comb polymers are easy to transport and store. Using the comb polymer in the solid state in particular advantageous if the comb polymer is present in the solid component (C) of the multi component composition. In this case, solid component (C) is a dry blend which typically is long time storable stable and which can be packaged in bags or even stored in silos.

In another preferred embodiment, the comb polymer is preferably used in the form of a liquid polymer composition, especially as an aqueous solution. A proportion of the comb polymer is in particular 5-80 wt.-%, especially 20-75 wt.-%, especially preferred 30-50 wt.-%, with respect to the total weight of the liquid polymer composition. Especially, if the comb polymer is present in component (A) of the multi component composition, the comb polymer is used in the form of a liquid polymer composition. This allows for an effective and easy intermixing with the further compounds present in component (A).

Polyol Component (A)

The polyol component (A) comprises one or more polyols, and water.

Optionally, one or more additives may be added to component (A), in particular the at least one comb polymer. Polyol component (A) is preferably a liquid component. The polyol component (A) may be viscous but is generally pourable.

Examples of suitable polyols are polyoxyalkylenepolyols, also referred to as "polyetherpolyols", polyesterpolyols, polycarbonatepolyols, poly(meth)acrylate polyols, polyhydrocarbon-polyols, polyhydroxy-functional acrylonitrile/butadiene copolymers and mixtures thereof, in particular diols thereof, and mixtures thereof.

Examples of polyetherpolyols are polyoxyethylenepolyols, polyoxypropylenepolyols and polyoxybutylenepolyols, in particular polyoxyethylenediols, polyoxypropylenediols, polyoxybutylenediols, polyoxyethylenetriols and polyoxypropylenetriols. Polyoxyalkylenediols or polyoxyalkylenetriols having a degree of unsaturation of less than 0.02 meq/g and having an average molecular weight in the range from 1,000 to 30,000 g/mol and polyoxyethylenediols, polyoxyethylenetriols, polyoxypropylenediols and polyoxypropylenetriols having an average molecular weight of from 400 to 8,000 g/mol are suitable.

Further examples of polyetherpolyols are so-called ethylene oxide-terminated ("EO-endcapped", ethylene oxide-end-capped) polyoxypropylenepolyols, styrene-acrylonitrile-grafted polyetherpolyols, e.g. Lupranol® from BASF Polyurethanes GmbH, Germany.

Particularly preferred polyols to be used in the present invention are polyhydroxy-functional fats and oils, for example natural fats and oils, such as castor oil, or polyols obtained by chemical modification of natural fats and oils, so-called oleochemical polyols. Castor oil is particularly preferred.

Examples of chemically modified natural fats and oils are polyols obtained from epoxypolyesters or epoxypolyethers obtained, for example, by epoxidation of unsaturated oils, by subsequent ring opening with carboxylic acids or alcohols, polyols obtained by hydroformylation and hydrogenation of unsaturated oils, or polyols which are obtained from natural fats and oils by degradation processes, such as alcoholysis or ozonolysis, and subsequent chemical linkage, for example by trans esterification or dimerization, of the degradation products thus obtained or derivatives thereof. Suitable degradation products of natural fats and oils are in particular fatty acids and fatty alcohols and fatty acid esters, in particular the methyl esters (FAME), which can be derivatized, for example, by hydroformylation and hydrogenation to give hydroxy-fatty acid esters.

The polyols mentioned above usually have a relatively high molecular weight, for instance, an average molecular weight of from 250 to 30,000 g/mol, in particular from 1,000 to 30,000 g/mol, and/or an average OH functionality in the range from 1.6 to 3.

Further examples of suitable polyols are low molecular weight di- or polyhydric alcohols, e.g., with a molecular weight of less than 250 g/mol. Examples thereof are 1,2-ethanediol, 1,2- and 1,3-propanediol, neopentylglycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, 1,3- and 1,4-cyclohexanedimethanol, hydrogenated bisphenol A, dimeric fatty alcohols, 1,1,1-trimethylolethane, 1,1,1-trimethylolpropane, glycerol, pentaerythritol, sugar alcohols, such as xylitol, sorbitol or mannitol, sugars, such as sucrose, other alcohols having a higher functionality, low molecular weight alkoxylation products of the abovementioned di- and polyhydric alcohols, and mixtures thereof.

While said low molecular weight di- or polyhydric alcohols may be used as the polyol, the use of the polyols mentioned above having a high molecular weight is preferred. In a preferred embodiment at least one high molecular weight polyol and at least one low molecular weight di- or polyhydric alcohol are used in combination.

As mentioned, a low molecular weight polyol is considered to have a molecular weight of less than 250 g/mol, whereas a high molecular weight polyol is considered to have an average molecular weight of 250 g/mol or more. In a preferred embodiment binder component (A) comprises at least one low molecular weight polyol, preferably in combination with at least one high molecular weight polyol, in particular castor oil.

Particularly preferred is a combination of one or more polyhydroxy-functional fats and oils, such natural fats and oils, or polyols obtained by chemical modification of natural fats and oils, in particular castor oil, and one, two or more low molecular weight di- or polyhydric alcohols. In such combinations, the one or more polyols having a high molecular weight are usually used in higher amounts than the at least one low molecular weight di- or polyhydric alcohol.

Especially preferred, the polyol component (A) comprises ethylene glycol, triethylene glycol, castor oil and/or a chemical modification of castor oil.

Apart from the at least one polyol and water, the polyol component (A) may contain further additives. Such additives are commonly used, if desired, and typically known to the persons skilled in the art. Examples of optional further additives are plasticizers, pigments, adhesion promoters, such as silanes, e.g. epoxysilanes, (meth)acrylatosilanes and alkylsilanes, stabilizers against heat light and UV radiation, thixotropic agents, flow improving additives, flame retardants, surface active agents such as defoamers, wetting agents, flow control agents, deaerating agents, biocides and emulsifiers. Especially, these substances, in particular the plasticizers, are chemically and/or structurally different from the at least one comb polymer.

Preferably used optional additives for component (A) are one or more of plasticizers, such as benzoates, benzyl phthalates, e.g. Santicizer®160, and diisopropylbenzene, e.g. Benzoflex®9-88; pigments, such as inorganic and organic pigments, e.g. Bayferrox® and Heucosin®; defoamers, such as solvent free and silicon free defoamers, e.g. solvent free and silicon free polymer-based defoamers, and polyorganosiloxanes, e.g. Tego® Airex and Efka®; and emulsifiers such as calcium hydroxide.

Hardener Component (B)

The hardener component (B) comprises one or more polyisocyanates.

Hardener component (B) is preferably a liquid component. The hardener component (B) may be viscous but is generally pourable. Such polyisocyanates are commercially available and widely used as hardener for polyols. Examples for suitable polyisocyanates are hexamethylene diisocyanate (HDI), HDI trimers such as Desmodur® N 3600, toluene diisocyanate (TDI), isophorone diisocyanate (IPDI) such as Vestamat® T 1890, methylene diphenyl diisocyanate and derivatives of these polyisocyanates, wherein HDI and its derivatives, and methylene diphenyl diisocyanate and its derivatives are preferred.

Preferably, the hardener component (B) comprises a polyisocyanate compound with a NCO functionality of at least 2, especially at least 2.5, especially at least 2.7

Monomeric and polymeric methylene diphenyl diisocyanate is most preferred.

In the following, methylene diphenyl diisocyanate is abbreviated as MDI as usual. MDI is a useful compound, e.g. as a starting material for polyurethane production, and produced worldwide in millions of tons annually. A plurality of different product grades of MDI is available. "Methylene diphenyl diisocyanate" as this term is used in the present invention, include, depending on its grade, monomeric and polymeric methylene diphenyl diisocyanate.

MDI is available in the form of three different isomers, namely 4,4'-methylene diphenyl diisocyanate (4,4'-MDI), 2,4'-methylene diphenyl diisocyanate (2,4'-MDI), and 2,2'-methylene diphenyl diisocyanate (2,2'-MDI). Commercially available MDI can be classified into monomeric MDI (also designated MMDI) and polymeric MDI (PMDI) referred to as technical MDI. Polymeric MDI is the raw product of MDI synthesis containing MDI isomers and oligomeric species. Monomeric MDI is obtained from polymeric MDI by purification.

Monomeric MDI refers to "pure" MDI including products of a single MDI isomer or of isomer mixtures of two or three MDI isomers. The isomeric ratio can vary in wide ranges. For instance, 4,4'-MDI is a colorless to yellowish solid having a melting point of 39.5° C. Commercial monomeric MDI is often a mixture of 4,4'-MDI, 2,4'-MDI and typically very low levels of 2,2'-MDI.

Polymeric MDI includes oligomeric species. Usually MDI isomers are also included in polymeric MDI. Thus, polymeric MDI may contain a single MDI isomer or isomer mixtures of two or three MDI isomers, the balance being oligomeric species. Polymeric MDI tends to have isocyanate functionalities of higher than 2. The isomeric ratio as well as the amount of oligomeric species can vary in wide ranges in these products. For instance, polymeric MDI may typically contain about 30 to 80 wt. % of MDI isomers, the balance being said oligomeric species. As in the case of monomeric MDI, the MDI isomers are often a mixture of 4,4'-MDI, 2,4'-MDI and very low levels of 2,2'-MDI. Polymeric MDI is typically a brown or dark amber liquid at room temperature (23° C.).

The oligomeric species are oligomers usually having a NCO functionality of 3 or higher. The oligomeric species are a result of the synthesis process and can be represented by the foil wing formula

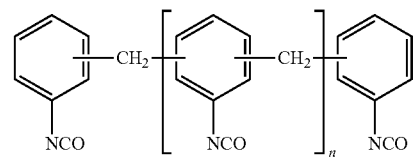

wherein n is 1 to 4 and higher. The amount of the homologues decreases with increasing chain length. The total content of homologues with n higher than 4 is generally not very high.

A wide variety of polymeric MDI grades is available with varying characteristics as to the number, type and content of isomers and oligomeric species, isomeric ratio, and weight distribution of the oligomeric homologues. These characteristics depend on type and conditions of synthesis and purification procedures. Moreover, the characteristics can be adjusted, e.g., by mixing different MDI grades according to the needs of the customer.

The hardener component (B) comprising at least one polyisocyanate may optionally comprise one or more further additives, e.g. solvents, in relatively small amounts, e.g. up to 20 or up to 10 wt. % of the additives all together, preferably up to 5 wt. % and more preferably up to 2 wt. % based on the total weight of the hardener component (B). Suitable solvents include but are not limited to esters, ketones, hydrocarbons and chlorinated hydrocarbons. If MDI is used, it is generally preferred however, that the hardener component (B) comprising an isocyanate hardener essentially consists of MDI, i.e. monomeric MDI and/or polymeric MDI, e.g. with an amount of other additives of less than 2 wt. %. Since the MDI products are technical products, they may, of course, include low quantities of impurities.

Solid Component (C)

Component (C) is a solid component comprising a hydraulic binder and optionally one or more aggregates. Especially, solid component (C) comprises the at least one comb polymer.

Component (C) is preferably a powder.

Hydraulic binders are widely used in construction applications. They are usually used for concretes or mortars typically also including aggregates and additives. For use, the composition comprising the hydraulic binder is mixed with water so that a reaction of the hydraulic binder and water takes place, generally called hydration. Upon hydration, the hydraulic binder is hardened to form a solid building material.

A hydraulic binder is a substantially inorganic or mineral material or blend, which hardens when mixed with water. Hydraulic binders also encompasses latent hydraulic binders or pozzolanic binders which usually requires activation, e.g. by the presence of lime, in order to show hydraulic properties. All hydraulic binders known to those skilled in the art are suitable.

Typical examples of suitable hydraulic binders are at least one of cement, e.g. Portland cement, fly ash, granulated blast furnace slag, lime, such as limestone and quicklime, rice husk, calcined paper sludge, fumed silica and pozzolana or a mixture thereof. The hydraulic binder may comprise cement and/or cement substitutes such as fly ash, granulated blast furnace slag, lime, such as limestone, hydrated lime and quicklime, rice husk, calcined paper sludge, fumed silica and pozzolana. Hydraulic binders such as cement often include in addition calcium sulfate, such as gypsum, anhydrite and hemihydrate. The hydraulic binder preferably comprises calcined paper sludge, a Portland cement or a mixture of Portland cement with at least one of supplementary cementing materials such as fly ash, granulated blast furnace slag, lime, such as limestone, hydrated lime and quicklime, rice husk, calcined paper sludge, fumed silica and pozzolana.

In a preferred embodiment, the hydraulic binder comprises calcined paper sludge, a Portland cement or a mixture of Portland cement and calcined paper sludge. In such embodiments, the hydraulic binder may also include lime, in particular hydrated lime ($Ca(OH)_2$) and/or quicklime (CaO), in particular when calcined paper sludge is contained in the hydraulic binder.

By partial or complete substitution of cement, in particular Portland cement, with one or more supplementary cementing materials as outlined above, in particular calcined paper sludge, the shrinkage of the composition during curing can be reduced drastically. There is also less dust formation during addition of component (C) when a supplementary cementing material, in particular calcined paper sludge, is included in the hydraulic binder.

Paper sludge is a well-known waste product of paper production and in particular a waste product formed during deinking of recycled paper. The latter paper sludge is also called deinked sludge or deinked paper sludge. Paper sludge originating from the deinking process of recycled paper is preferred.

The paper sludge is usually dried before it is calcined. The dried paper sludge is calcined to form calcined paper sludge. Calcination is a known process where the product is subjected to heat treatment. The calcination conditions may vary to a large extent depending on the composition of the paper sludge, the desired characteristics of the product and the duration of the heat treatment. By calcining the paper sludge the organic content is at least partially removed and the latent pozzolanic properties of the mineral content are activated. The calcined paper sludge is preferably carbon-free. The calcined paper sludge may be prepared by subjecting the substantially dried paper sludge to temperatures e.g. in the range of from 350 to 900° C., preferably from 500 to 850° C. and more preferably from 650 to 800° C. The heat treatment may last e.g. from 1 to 8 h, preferably 2 to 5 h. The heat treatment may be effected e.g. in a simple furnace or a fluidized bed combustion system.

Particularly preferred calcined paper sludge is obtained from the process described in WO 96/06057 by CDEM Minerals BV, Netherlands, where paper sludge is calcined at a temperature in the range of 720 to 850° C. A fluidized bed system is used for heat treatment.

Calcined paper sludge is commercially available, for instance from CDEM Minerals BV, Netherlands, under the trade name TopCrete®. TopCrete® is a zero carbon material. Calcined paper sludge is usually present in form of a powder. The color typically ranges from white to beige.

The precise composition of calcined paper sludge strongly depends on the chemistry of the paper residue inputs and the thermal conditions applied. Usually, the main ingredients of calcined paper sludge are calcium compounds such as CaO, $Ca(OH)_2$ and $CaCO_3$, and kaolinite or preferably metakaolinite. The calcined paper sludge may e.g. comprise, expressed as % oxides, $SiO_2$ (e.g. 10-40 wt. %, preferably 15-35 wt. %), CaO (e.g. 20-90 wt. %, preferably 25-60 wt. % or 30-45 wt. %), $Al_2O_3$ (e.g. 5-30 wt. %, preferably 13-20 wt. %), MgO (e.g. 1-7 wt. %, preferably 2-4 wt. %), and other metal oxides (e.g. each less than 1 wt. %). The calcined paper sludge may also contain volatile material, for instance in the form of $Ca(OH)_2$ or $CaCO_3$ or organic material the content of which strongly depends on raw material used and the heat treatment conditions applied.

Solid component (C) preferably further comprises one or more aggregates. Aggregates are chemically inert, solid particulate materials. Aggregates come in various shapes, sizes, and materials ranging from fine particles of sand to large, coarse rocks. Examples of suitable aggregates are sand, such as silica sand, gravel, and crushed stone, slag, calcined flint, lightweight aggregates such as clay, pumice, perlite, and vermiculite. Sand, in particular silica sand, is preferably used to reach the workability expected and to obtain a smooth surface.

The grain size of the aggregates may vary depending on the application, but is preferably rather small, e.g. not more than 6 mm, preferably not more than 4 mm. The aggregate may have, for instance, a grain size in the range of 0.05 to 4 mm, wherein sand, in particular silica sand, having a grain size in the range of 0.1 to 2 mm is particularly preferred. For instance, sand having a grain size ranging from 0.3 to 0.8 mm or from 0.1 to 0.5 mm can be advantageously used in the present invention. For applications such as covering or a heavy-duty screed for trowelled finish, aggregates such as sand having a size of e.g. 3 mm to 4 mm are suitable. The grain size range can be determined, e.g. by sieve analysis.

Solid component (C) may optionally comprise one or more additives, which are commonly used, if desired, and typically known to the persons skilled in the art of cementitious applications. Examples of suitable additives, which may be optionally used in component (C), are oil such as mineral oil, paraffin oil and organic oil, cellulose fibers, and inorganic or organic pigments. A further additive, which may be contained in solid component (C), is lime such as hydrated lime, and burnt lime.

Suitable Proportions for the Multi-Component Composition

The multi-component composition of the invention is preferably formulated such that the content of the one or more polyisocyanates is in the range of 10 to 25% by weight, preferably 10 to 20% by weight, more preferably 15 to 20% by weight, based on the total weight of the multi-component composition.

The multi-component composition is preferably formulated such that the content of the hydraulic binder is in the range of 10 to 30% by weight, preferably in the range of 15 to 25% by weight, based on the total weight of the multi-component composition. This preferred content of the hydraulic binder also includes the weight of calcium hydroxide and/or calcium oxide, if present. If present, the content of calcium hydroxide and/or calcium oxide, considered alone, may be, e.g., in the range of 1 to 5% by weight, based on the total weight of the multi-component composition.

The multi-component composition is preferably free of metal chloride. Free of metal chloride means that the content of metal chloride is less than 0.05% by weight, preferably less than 0.02% by weight based on the total weight of polyols and polyisocyanates in the multi-component composition.

Also, in a preferred embodiment, the multi-component composition is essentially free of lime, in particular hydrated lime $(Ca(OH)_2)$ and/or quicklime (CaO). Free of lime means that the content of lime, in particular hydrated lime (Ca $(OH)_2$) and/or quicklime (CaO), in the composition is less than 1% by weight, preferably less than 0.5% by weight, more preferably less than 0.1% by weight most preferably less than 0.01% by weight or less than 0.001 by weight, based on the total weight of the multi-component composition. In particular, the multi component composition is completely free of lime, in particular free of hydrated lime $(Ca(OH)_2)$ and/or free of quicklime (CaO).

Further, the multi-component composition is preferably formulated such that the weight ratio of water to hydraulic binder is in the range of 0.15 to 0.35, preferably in the range of 0.2 to 0.3. The molar ratio of NCO groups to alcoholic OH groups in the multi-component composition is preferably in the range of from 3 to 5 and more preferably in the range of from 3.5 to 4.5. Said molar ratio further improves compressive strength of the finished product. The molar ratio can easily be determined via the equivalent weights of the polyols and polyisocyanates used.

Component (A) is preferably formulated such that the water content is in the range of 10 to 40% by weight, preferably 20 to 30% by weight, and/or the content of one or more polyols, preferably including castor oil, is 35 to 55, preferably 38 to 45% by weight, based on the total content of component (A). In a preferred embodiment at least one high molecular weight polyol, preferably castor oil, and at least on low molecular polyol are contained in component (A). In this case, the content of high molecular weight polyol such as castor oil is e.g. in the range of 33 to 45% by weight, and the content of low molecular weight polyol is e.g. in the range of 2 to 10% by weight, based on the total content of component (A).

Component (C) is for instance formulated such that the content of the hydraulic binder, including calcium hydroxide and/or calcium oxide, if present, is in the range of 10 to 40% by weight, preferably 20 to 35% by weight, based on the total weight of component (C), wherein it is preferred that the hydraulic binder comprises cement, in particular Portland cement, calcined paper sludge or a mixture thereof. The content of one or more aggregates is e.g. in the range of 60 to 90 wt. %, preferably in the range of 65 to 80 wt. %, based on the total weight of solid component (C). Component (C) may also comprise one or more additives as mentioned above.

As mentioned, in the use according to the present invention, the hydraulic binder of component (C) preferably comprises cement, in particular Portland cement, calcined paper sludge or a mixture of calcined paper sludge and cement, in particular Portland cement. If calcined paper sludge is present, the solid component (C) may e.g. comprise from 10 to 100 wt. %, preferably from 50 to 100 wt. %, more preferably from 80 to 100 wt. %, in particular about 100 wt. % calcined paper sludge, based on the total weight of cement, in particular Portland cement, if present, and calcined paper sludge in component (C).

The comb polymer can in principle be present in at least one of the compounds (A) to (C) and/or in a further component of the multi component composition.

Especially, the multi component composition can be a four component composition with a polymer component (D) comprising or consisting of the comb polymer. Most Preferably, the comb polymer is present in polyol component (A) and/or solid component (C). Especially, the comb polymer is not present in component (B).

Advantageously, the comb polymer is present in an amount of 0.001-2 wt.-%, in particular 0.01-1 wt.-%, especially 0.015-0.1 wt.-% with respect to the total weight of the multi-component composition.

In particular the comb polymer is present in polyol component (A), preferably with a proportion of 0.001-5 wt.-%, in particular 0.01-2 wt.-%, especially 0.1-1 wt.-% with respect to the total weight of polyol component (A).

In another preferred embodiment, the comb polymer is present in solid component (C), preferably with a proportion of 0.001-2 wt.-%, in particular 0.01-1 wt.-%, especially 0.015-0.1 wt.-% with respect to the total weight of powder component (C). In this case, the comb polymer is in particular present in the solid state of aggregation, especially in the form of a powder.

Especially, an overall weight ratio between the hydraulic binder and the comb polymer in the multi-component composition is between 10-1,000, in particular 100-900, especially 300-800.

A first highly beneficial multi-component composition is as follows: A three-component composition, especially for manufacture of a polyurethane cementitious hybrid system or flooring, comprising or consisting of:

a) a polyol component (A) comprising, with respect to the total weight of polyol component (A):
  33 to 55 wt.-%, preferably 38 to 45 wt.-%, of a polyhydroxy-functional fat and/or oil, especially castor oil,
  2 to 10 wt.-% of a low molecular weight di- or polyhydric alcohols, especially ethylene glycol and/or triethylene glycol
  10 to 40% by weight, preferably 20 to 30% by weight, of water,
  0.01-2 wt.-%, especially 0.1-1 wt.-%, of at least one comb polymer, in particular a polycarboxylate ether with a polycarboxylate backbone and polyether side chains, wherein the polyether side chains are bound via ester, ether and/or amide groups to the polycarboxylate backbone;

b) a hardener component (B) comprising, with respect to the total weight of the hardener component (B), 90-100 wt.-%, especially 95-100 wt. % or 100 wt.-%, monomeric and polymeric methylene diphenyl diisocyanate;
c) a solid component (C) comprising, with respect to the total weight of the solid component (C):
  10 to 40 wt.-%, preferably 20 to 35 wt.-%, of at least one hydraulic binder, in particular cement,
  60 to 90 wt. %, preferably 65 to 80 wt. %, of aggregates, in particular sand.

A second highly beneficial multi component composition is as follows: A three-component composition, especially for manufacture of a polyurethane cementitious hybrid flooring, comprising or consisting of:
a) a polyol component (A) comprising, with respect to the total weight of polyol component (A):
  33 to 55 wt.-%, preferably 38 to 45 wt.-%, of a polyhydroxy-functional fat and/or oil, especially castor oil,
  2 to 10 wt.-% of a low molecular weight di- or polyhydric alcohols, especially ethylene glycol and/or triethylene glycol
  10 to 40% by weight, preferably 20 to 30% by weight, of water,
b) a hardener component (B) comprising, with respect to the total weight of the hardener component (B), 90-100 wt.-%, especially 95-100 wt. % or 100 wt.-%, monomeric and polymeric methylene diphenyl diisocyanate;
c) a solid component (C) comprising, with respect to the total weight of the solid component (C):
  10 to 40 wt.-%, preferably 20 to 35 wt.-%, of at least one hydraulic binder, in particular cement,
  60 to 90 wt. %, preferably 65 to 80 wt. %, of aggregates, in particular sand,
  0.01-1 wt.-%, especially 0.015-0.1 wt.-%, of at least one comb polymer, in particular a polycarboxylate ether with a polycarboxylate backbone and polyether side chains, wherein the polyether side chains are bound via ester, ether and/or amide groups to the polycarboxylate backbone, whereby the comb polymer is preferably in the solid state of aggregation, especially in the form of a powder.

However, other multi-component compositions might be beneficial as well.

Use of the Multi-Component Composition

When the components of the multi-component composition are mixed, the hydraulic binder reacts with water. This reaction is generally called hydration. Upon the reaction with the water, the hydraulic binder is cured to a solid material. Moreover, the one or more polyols of component (A) and the one or more polyisocyanates of hardener component (B) react upon mixture so that the organic binder is also cured. Thus, upon curing a hybrid solid material comprising an inorganic binder portion and an organic binder portion in which the aggregates are bound is formed.

The reaction of the one or more polyols and of the one or more polyisocyanates results in cured organic binder which is a polyurethane. Thus, the hybrid solid material after curing comprises an inorganic network and an polyurethane network which form the matrix of the hybrid solid material. Accordingly, the polyurethane or polyurethane network, respectively, formed is not soluble in water.

For use, the polyol component (A) and the hardener component (B) are usually mixed with each other, and then solid component (C) is added to this mixture. Then the mixture is applied as the construction or repair material on a desired location and in a desired shape to construct, repair or refurbish the component part. Especially, the mixture is used for the manufacture of a polyurethane cementitious hybrid flooring or coating.

The application temperature is e.g. from about 8 to 40° C., preferably from about 10 to 30° C.

As already mentioned, the polyol component (A) preferably comprises a castor oil, in particular a castor oil emulsion, as polyol. The hardener component (B) preferably comprises a methylene diphenyl diisocyanate, in particular a polymeric methylene diphenyl diisocyanate, as polyisocyanate. If the polyol component (A) comprises castor oil or if the hardener component (B) comprises a methylene diphenyl diisocyanate, in particular a polymeric methylene diphenyl diisocyanate, the early water resistance of the multi-component composition is improved.

As already mentioned, the hydraulic binder preferably comprises cement, calcined paper sludge or cement and calcined paper sludge. For this embodiment, it is also preferred that polyol component (A) comprises a castor oil, in particular a castor oil emulsion, and/or the hardener component (B) comprises a methylene diphenyl diisocyanate, in particular a polymeric methylene diphenyl diisocyanate.

The multi-component composition used as construction or repair material is preferably a flooring material, a coating composition, a grout or a putty.

Method for the Manufacture of Floorings, Screeds and Coatings

Furthermore, the present invention is concerned with a method for preparing a flooring, screed and/or coating, in particular a polyurethane cementitious hybrid flooring or coating, whereby the components of a multi component composition as described above are mixed and applied to a substrate. The multi component composition of the invention is in particular suitable to prepare a polyurethane cementitious hybrid flooring or coating.

The method comprises in particular:
a) mixing polyol component (A) and hardener component (B),
b) adding solid component (C) to the mixture of polyol component (A) and hardener component (B) and mixing, to obtain a mixed material,
c) applying the mixed material to a substrate,
d) optionally smoothing the applied mixed material, and
e) curing the applied mixed material, to obtain the flooring, screed and/or coating.

A typical layer thickness e.g. ranges from 2 to 6 mm. The application temperature is preferably from about 12 to 35° C. Fast curing in less than 24 h for a wide range of temperatures can be achieved. Application of a top sealer is not required so that one day application is possible.

High compressive strengths can be achieved. The compressive strength of the flooring or coating obtained is preferably at least 45 $N/mm^2$, e.g. in the range of 45 to 55 $N/m^2$, preferably in the range of 50 to 55 $N/m^2$ at 23° C./50% relative humidity measured 1 day after application, and preferably at least 50 $N/mm^2$, more preferably at least 58 $N/mm^2$, e.g. in the range of 58 to 68 $N/m^2$, preferably 62 to 65 $N/m^2$ after 28 days.

The multi-component compositions described herein are especially suitable as a self-levelling system or screed. The mixing and curing of such compositions as described herein according to the invention provides flooring and coating systems having a glossy/semiglossy surface of more than 20 GU, in preferred embodiments exhibiting gloss values of more than 30 GU, more preferably more than 40 GU, more preferably more than 50 GU, even more preferably more than 60 GU, especially preferably more than 70 GU, most preferably more than 80 GU based on the gloss measurement method according to EN ISO 2813, and outstanding properties as to mechanical properties such as compressive strength, open time and workability, as well as chemical and mechanical resistance. The flooring or coating obtained by mixing and curing such a composition according to the present invention is an aspect of the present invention.

The application of the construction material or repair material can be effected by any conventional application method. The application of the construction material or repair material is preferably by coating, flooring, grouting or puttying.

A further aspect of the present invention is directed to the use of a comb polymer, in particular as described above, for reducing blister formation in coating, mortar and/or screed compositions based on polyurethane and hydraulic binders, especially in polyurethane cementitious hybrid flooring systems.

The invention is further explained in the following experimental part, which, however shall not be construed as limiting the scope of the invention. The proportions and percentage indicated are by weight, unless otherwise stated.

EXEMPLARY EMBODIMENTS

First Example of a Three-Component Composition for Flooring Application

Tables 1, 2 and 3 show the compositions of three components (A), (B) and (C) of a first inventive three-component composition C1 which can be used for flooring applications. Thereby, the comb polymer is present in solid component (C) in powder form.

TABLE 1

| Polyol component (A) | |
| --- | --- |
| Compound | Proportion [wt.-%] |
| Castor oil | 44 |
| Plasticizer (e.g. butyl benzyl phthalate) | 20 |
| Triethylene glycol | 5 |
| Pigment (inorganic; e.g. Bayferrox ®) | 6 |
| Water | 25 |

TABLE 2

| Hardener component (B) | |
| --- | --- |
| Compound | Proportion [wt.-%] |
| Diphenylmethane diisocyanate (Desmodur VLR10; Covesto) | 100 |

TABLE 3

| Solid component (C) | |
| --- | --- |
| Compound | Proportion [wt.-%] |
| Portland cement CEM I 52.5 | 31.00 |
| Aggregates | |
| Silica Sand (0.3-0.8 mm) | 34.96 |
| Silica Sand (0.5-1.6 mm) | 34.00 |
| Comb polymer: Polycarboxylate ether in powder form | 0.04 |

As polycarboxylate ether, commercially available polycarboxylate ethers (PCE) were used, as marketed, for example, as products for concrete additives by Sika Schweiz AG. Specifically, a comb polymer based on a poly(methacrylic acid) main chain ($R^1$=COOM; $R^2$=$R^5$=Me; $R^3$=$R^4$=$R^6$=$R^7$=H) with m=0, p=1 and $R^8$=$[AO]_n$=$R^a$ where A=C2 alkylene, n=45 and $R^a$=$CH_3$.

Second Example of a Three-Component Composition for Flooring Application

Tables 4, 5 and 6 show the compositions of three components (A), (B) and (C) of a first inventive three-component composition C2 which can be used for flooring applications. Thereby, the comb polymer is present in component (A) in a form of an aqueous solution.

TABLE 4

| Polyol component (A) | |
| --- | --- |
| Compound | Proportion [wt.-%] |
| Castor oil | 43.2 |
| Plasticizer (e.g. butyl benzyl phthalate) | 20 |
| Triethylene glycol | 5 |
| Pigment (inorganic; e.g. Bayferrox ®) | 6 |
| Water | 25 |
| Comb polymer: aqueous solution of a polycarboxylate ether (40 wt.-% in water) | 0.8 |

The chemical structure of the comb polymer used in the second example is similar to the one of the first example.

TABLE 5

| Hardener component (B) | |
| --- | --- |
| Compound | Proportion [wt.-%] |
| Diphenylmethane diisocyanate (Desmodur VLR10; Covesto) | 100 |

TABLE 6

| Solid component (C) | |
| --- | --- |
| Compound | Proportion [wt.-%] |
| Portland cement CEM I 52.5 | 31.00 |
| Aggregates | |
| Silica Sand (0.3-0.8 mm) | 35.00 |
| Silica Sand (0.5-1.6 mm) | 34.00 |

Comparative Example Compositions

A first comparative example R1 has been produced similar to example C1, however, no comb polymer has been added to the composition.

Furthermore, a second comparative example R2 has been produced similar to example C1, however, the proportion of Portland cement has been reduced to 28 wt.-% and instead of a comb polymer, 3 wt.-% hydrated lime has been added to component (C). Thus, component (C) of comparative example consists of: 28 wt.-% Portland cement, 3 wt.-% of hydrated lime ($Ca(OH)_2$), and in total 69 wt.-% of sand. The further components (A) and (B) are identical to example C1.

Using and Testing of Compositions

The components of the above mentioned compositions are mixed in a weight ratio of component A:component B:component C of 1:1:4. For mixing, component A is manually stirred for a short time (30 seconds), then part A and part B are mixed for about 1 min at 400 rpm. The mixture of A and B is then mixed with component (C) at a stirring speed of about 700 rpm for about 2 minutes.

In order to simulate flooring applications, the mixtures obtained are applied onto substrates of 0.3 m×0.26 m with a frame of 5 mm height. The layer thickness of the applied mixtures on the substrates is about 4.5 mm. Afterwards, the surfaces of the mixtures are spike rolled and placed in an oven at 35° C. for about 24 hours.

After curing, the surfaces of the samples have been visually inspected for cracks and blister formation.

Thereby, the following observations were made: With the composition according to comparative example R1 (without lime and without comb polymer), numerous blisters giving rise to an uneven and inhomogeneous surface appearance could be observed. The composition according to reference example R2 (with lime) produced a smooth, leveled surface without any blisters recognizable. A similar result was obtained with inventive compositions C1 and C2. In both cases, smooth, leveled surface without any blisters could be obtained.

Thus, these results clearly show that comb polymers can be used in order to reduce or avoid blister formation in hybrid systems based on polyurethane and hydraulic binders, in particular in polyurethane cementitious hybrid systems. Especially, comb polymers represent a suitable and highly advantageous alternative for known and problematic blister reducing agents such as lime.

It will be appreciated by those skilled in the art that the present invention can be embodied in other specific forms without departing from the spirit or essential characteristics thereof. The presently disclosed embodiments are therefore considered in all respects to be illustrative and not restricted.

The invention claimed is:

1. A multi-component composition for manufacture of a polyurethane cementitious hybrid coating or flooring, comprising:
   a) a polyol component (A) comprising at least one polyol and water;
   b) a hardener component (B) comprising at least one polyisocyanate compound; and
   c) a solid component (C) comprising at least one hydraulic binder and at least one comb polymer having: (i) a main chain comprising acid groups, and (ii) side chains being attached to the main chain, wherein:
   the at least one comb polymer is in a solid state in the solid component (C), and
   the at least one comb polymer is present in an amount of from 0.001 to 2 wt.-% with respect to a total weight of the composition.

2. The composition according to claim 1, wherein an overall weight ratio of the at least one hydraulic binder and the at least one comb polymer in the multi-component composition is between 10-1,000.

3. The composition according to claim 1, wherein the at least one comb polymer comprises the following structural subunits:
   a) a mole fractions of a structural subunit S1 of the formula (I)

b) b mole fractions of a structural subunit S2 of the formula (II)

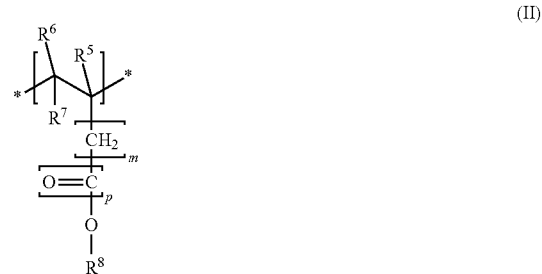

c) optionally c mole fractions of a structural subunit S3 of the formula (III)

d) optionally d mole fractions of a structural subunit S4 of the formula (IV)

where
$R^1$, in each case independently of any other, is —COOM, —SO$_2$—OM, —O—PO(OM)$_2$, or —PO(OM)$_2$,
$R^2$, $R^3$, $R^5$, $R^6$, $R^9$, $R^{10}$, $R^{13}$, and $R^{14}$, in each case independently of one another, are H or an alkyl group having 1 to 5 carbon atoms,
$R^4$, $R^7$, $R^{11}$, and $R^{15}$, in each case independently of one another, are H, —COOM, or an alkyl group having 1 to 5 carbon atoms,
M, independently of any other, is H$^+$, an alkali metal ion, an alkaline earth metal ion, a di- or trivalent metal ion, an ammonium ion, or an organic ammonium group,
m is 0, 1, or 2,
p is 0 or 1,
$R^8$ and $R^{12}$, in each case independently of one another, are a C$_1$ to C$_{20}$ alkyl, cycloalkyl or alkylaryl group, or are a group of the formula -[AO]$_n$—R$^a$, where A is $C_2$ to $C_4$ alkylene, $R^a$ is H, a $C_1$ to $C_{20}$ alkyl, cyclohexyl, or alkylaryl group, and n is 2-250, $R^{16}$, independently of any other, is $NH_2$, $-NR^bR^c$, or $-OR^dNR^eR^f$ where $R^b$ and $R^c$, independently of one another, are a $C_1$ to $C_{20}$ alkyl, cycloalkyl, alkylaryl, or aryl group, or are a hydroxyalkyl group or are an acetoxyethyl ($CH_3-CO-O-CH_2-CH_2-$) or a hydroxyisopropyl ($HO-CH(CH_3)-CH_2-$) or an acetoxyisopropyl ($CH_3-CO-O-CH(CH_3)-CH_2-$) group; or $R^b$ and $R^c$ together form a ring of which the nitrogen is a part, in order to construct a morpholine or imidazoline ring;

$R^d$ is a $C_2$-$C_4$ alkylene group, $R^e$ and $R^f$ each independently of one another are a $C_1$ to $C_{20}$ alkyl, cycloalkyl, alkylaryl, or aryl group, or a hydroxyalkyl group, and where a, b, c and d are mole fractions of the respective structural subunits S1, S2, S3, and S4, where a/b/c/d= (0.1-0.9)/(0.1-0.9)/(0-0.8)/(0-0.8), and with the proviso that a+b+c+d is 1.

4. The composition according to claim 1, wherein the polyol component (A) comprises at least one compound selected from the group consisting of: polyhydroxy-functional natural oils or fats, polyols obtained by chemical modification of a natural oils or fats, C2 to C12 alkyl diols, glycerol, sugars, and oligomers thereof.

5. The composition according to claim 1, wherein the polyol component (A) comprises ethylene glycol, triethylene glycol, castor oil, and/or a chemical modification of castor oil.

6. The composition according to claim 1, wherein the hardener component (B) comprises methylene diphenyl diisocyanate and/or polymeric methylene diphenyl diisocyanate.

7. The composition according to claim 1, wherein the polyol component (A) is formulated such that a water content is in a range of from 10 to 40% by weight, and an amount of the at least one polyol is in a range of from 35 to 55% by weight, based on a total content of component (A);

the solid component (C) is formulated such that an amount of the hydraulic binder is in a range of from 10 to 40% by weight, based on a total weight of component (C).

8. The composition according to claim 1, which is free of lime.

9. A method for preparing a flooring, screed and/or coating, comprising mixing the components of the composition according to claim 1, and applying the composition to a substrate.

10. A cured body, obtainable by the method according to claim 9.

11. A method comprising mixing at least one coating, mortar and/or screed composition based on polyurethane and hydraulic binders with at least one comb polymer having: (i) a main chain comprising acid groups, and (ii) side chains being attached to the main chain so as to reduce blister formation in the at least one coating, mortar and/or screed composition based on polyurethane and hydraulic binders.

12. The composition according to claim 1, wherein the at least one comb polymer is present in an amount of from 0.001 to 2 wt.-% with respect to a total weight of the solid component (C).

13. The composition according to claim 1, wherein the at least one polyol includes a first polyol and a second polyol, the first polyol being different from the second polyol.

14. The composition according to claim 13, wherein:

the first polyol has an average molecular weight of 250 g/mol or more, and the second polyol has a molecular weight of less than 250 g/mol.

15. The composition according to claim 14, wherein:

an amount of the first polyol is in a range of from 33 to 45% by weight based on a total content of the polyol component (A), and an amount of the second polyol is in a range of from 2 to 10% by weight based on the total content of the polyol component (A).

16. The composition according to claim 15, wherein:

the first polyol is a polyhydroxy-functional fat and/or oil, and the second polyol is a di- or polyhydric alcohol.

17. The method according to claim 11, wherein:

the at least one coating, mortar and/or screed composition based on polyurethane and hydraulic binders includes:

a) a polyol component (A) comprising at least one polyol and water;

b) a hardener component (B) comprising at least one polyisocyanate compound; and c) a solid component (C) comprising at least one hydraulic binder, the at least one comb polymer is present in an amount of from 0.001 to 2 wt.-% with respect to a total weight of the at least one coating, mortar and/or screed composition based on polyurethane and hydraulic binders, and the mixing includes mixing the at least one comb polymer in a solid state with the solid component (C).

* * * * *